United States Patent [19]

Wells et al.

[11] Patent Number: 4,579,310

[45] Date of Patent: Apr. 1, 1986

[54] GUIDES FOR ORGANIZING WIRES

[75] Inventors: Peter M. Wells, Sycamore; William W. Shely, St. Charles, both of Ill.

[73] Assignee: All-States Inc., Chicago, Ill.

[21] Appl. No.: 773,098

[22] Filed: Sep. 4, 1985

Related U.S. Application Data

[63] Continuation of Ser. No. 450,799, Dec. 17, 1983, abandoned.

[51] Int. Cl.⁴ .............................................. F16M 13/00
[52] U.S. Cl. .................... 248/544; 248/68.1; 248/74.3
[58] Field of Search ............ 248/542, 543, 544, 74.3, 248/68.1, 316.9, 74.1, 71, 73, 221.4, 58; 211/70.6, 89, 194

[56] References Cited

U.S. PATENT DOCUMENTS

| | | | |
|---|---|---|---|
| D. 190,429 | 5/1961 | Hogland | 248/68.1 |
| 1,221,517 | 4/1917 | Dunbar | 211/70.6 |
| 2,397,291 | 3/1946 | Robertson | 248/68.1 |
| 2,489,119 | 11/1949 | Burns et al. | 248/68 R |
| 2,640,236 | 6/1953 | Hume | 248/316 D |
| 2,997,531 | 8/1961 | Oldham et al. | 248/68 R |
| 3,170,612 | 2/1965 | Blumenschein | 211/70.6 |
| 3,590,752 | 7/1971 | De Pew | 211/194 |
| 4,199,070 | 4/1980 | Magnwssen | 211/194 |
| 4,244,544 | 1/1981 | Kornat | 248/68 R |
| 4,358,082 | 11/1982 | Reeves | 248/68 R |
| 4,437,633 | 3/1984 | André | 248/74 A |

Primary Examiner—Ramon S. Britts
Assistant Examiner—Ramon O. Ramirez
Attorney, Agent, or Firm—Laff, Whitesel, Conte & Saret

[57] ABSTRACT

An integral plastic strip is formed into a comb-like piece part having an elongated row of upstanding teeth or tabs. The root of the space between each adjacent pair of teeth or tabs is formed into a generally arcuate cove for receiving, embracing, and capturing a single wire or a cable which may be pressed into the cove. Adjacent each root cove, the teeth or tabs are marked with a number or other symbol which identifies the wire positioned there. There are a predetermined number of the root coves so that the wires or cables may be formed into discrete groups. Each strip has connectors near its opposite ends which enables a plurality of strips to be stacked together, in order to form a large group of the groups.

8 Claims, 5 Drawing Figures

U.S. Patent  Apr. 1, 1986  4,579,310
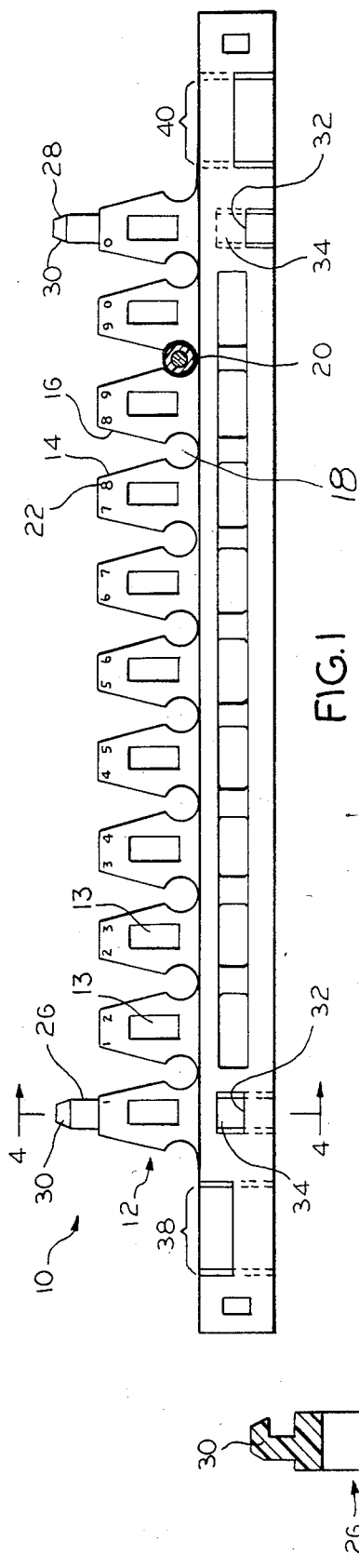
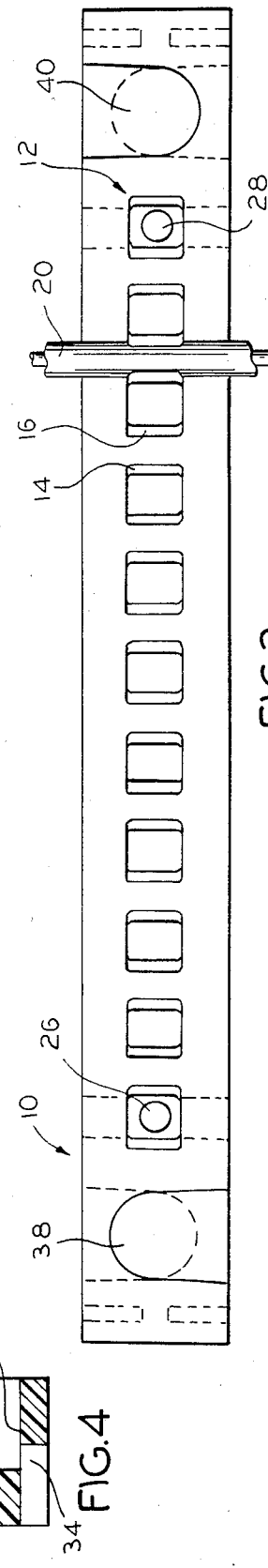
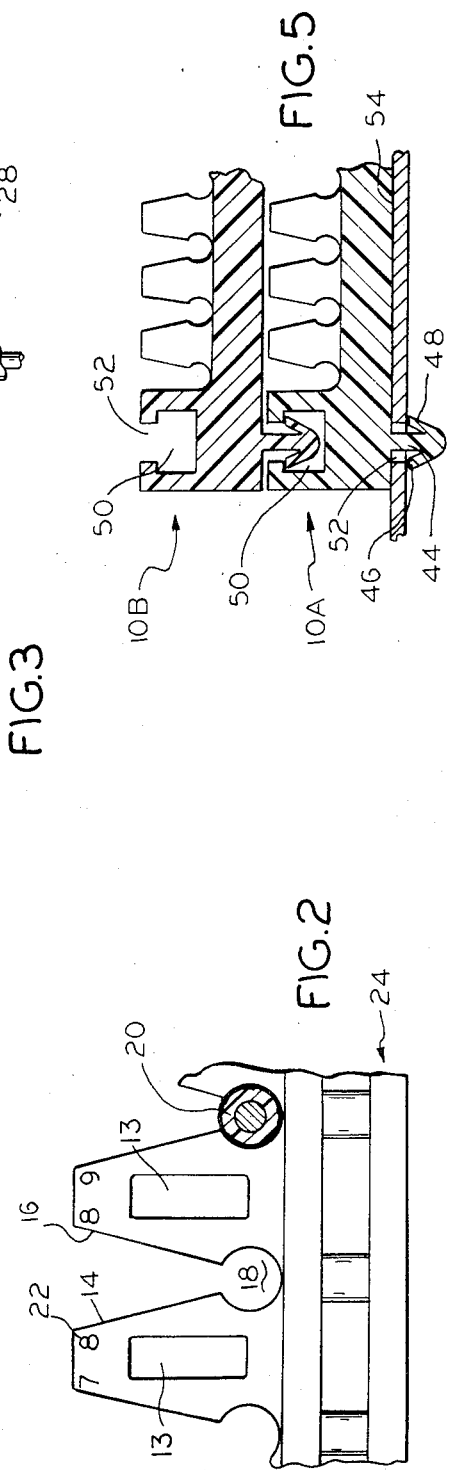

GUIDES FOR ORGANIZING WIRES

This is a continuation of U.S. patent application Ser. No. 450,799, filed Dec. 17, 1982, now abandoned.

This invention relates to wiring fixtures and more particularly to all plastic guides for organizing and identifying wiring.

There are many times and places where wires should be laid out in a predetermined or easily identifiable manner which enables a quick and easy location of selected wires. If the organization of the wires is sufficiently known, a wiring harness may be made. If not, the installer has to put together the harness as he goes. For example, a person installing a number of wires may wish to organize and reorganize them as an installation proceeds. Therefore, the wires are often relocated and pulled through each other, and thus, they tend to become a snarled "rat's nests" of wires. It would be better to place each wire in a temporary retainer which holds it in a fixed order relative to other wires before, during, and after their installation. Also, if the retainer has identifying notation imprinted on it, the wires are found quickly and easily, both during the installation and during any future repair.

For example, installations of telephone subsets generally include wire guide and terminal block combinations which may be located adjacent jumper fields in order to provide means for selectively identifying and then interconnecting any of a plurality of wires. Before they reach the terminal block, the wires fan-out through the wire guide so that they are easy to see, identify, manipulate, or service. One problem with these conventional wire guide and terminal block combination is that the wires cannot be removed from the wire guide without disconnecting them from the terminal block. Hence, it is difficult to relocate a wire in a fan out if it becomes necessary or desirable to do so. Also, it is not possible to quickly and easily relocate wires in a cable or wiring run.

The wire guide may be provided in any suitable size, for any given use. Nevertheless, since many installations are built on the conventional numbering system using the base of ten, it is convenient for a wire guide to provide for supporting and fanning out ten wires. This leads to a need for wiring guides which may be stacked and accumulated in groups of ten wires, per group.

Still another reason for wire guides is to provide strain relief for wires before they reach other devices, such as switches, terminals, electronic equipment, and the like.

A wire guide should also be a device which can be adapted to use with almost any hardware system. For example, it may have anchor bases for pushing into mounting holes on steel frames, or another chassis, or the like. It may be permanently installed by screws, rivets, etc. on harness boards, or printed circuit cards. Or, the wiring guide may be mounted on other wiring guides to make groups and super-groups.

Accordingly, an object of this invention is to provide new and novel wire guide means. Here, an object is to provide an integral all plastic unit which is capable of organizing and identifying wires in a basic group size (such as ten wires). In this connection, an object is to enable a plurality of these basic groups to be stacked, in order to form larger size groups.

In keeping with an aspect of the invention, these and other objects of the invention are accomplished by an integral plastic strip forming a comb-like piece part having upstanding teeth or tabs. The bottom or root of the space between each adjacent pair of teeth or tabs is formed into a cove for receiving, embracing and capturing a single wire or a pair of wires or a cable which may be pressed into the cove. Adjacent each root cove, the teeth or tabs are marked with a number or other symbol which identifies the wire which is positioned there. Each plastic strip has mechanical connectors near its opposite ends which enables a plurality of the strips to be stacked together.

A preferred embodiment of this invention is seen in the attached drawings, wherein:

FIG. 1 is a side elevation of an integral plastic strip having an elongated row of teeth or tabs forming a comb-like piece part;

FIG. 2 is an enlarged, front elevation view (taken from FIG. 1) of a pair of teeth or tabs with a root cove between them;

FIG. 3 is a plan view looking down onto the top of the strip as viewed in FIG. 1;

FIG. 4 is an enlarged cross sectional view of a connector at the end of the strip, for assemblying a plurality of strips into larger groups; and FIG. 5 shows a stacked plurality of the strips which are snapped together, and mounted on a chassis by push mounts or anchor bases.

FIGS. 1 and 3 show the integral, plastic, comb-like strip which forms the inventive wire guide 10. A plurality of upstanding teeth or tabs 12 are formed into a row extending linearly along the length of the strip. Each of the teeth or tabs 12 has a window 13 formed therein to provide a degree of flexibility in the adjoining sidewalls 14, 16 of the teeth or tabs. The window is open downwardly into the area of the teeth or tabs which is adjacent a root cove so that there is a selected amount of flexibility at the shoulder between the sidewalls 14, 16 and the cove 18. Thus, the plastic teeth are flexible enough to give a little so that a wire may be forced into or pulled out of a cove formed at the root of the teeth. The lower end of the space between each pair of adjacent teeth (as at 14, 16; FIG. 2) terminates in a relatively narrow entrance to an arcuate root cove 18, which has a diameter or other dimension adequate to receive, embrace, grip, and capture a single wire or "cable" 20 which may be pushed downwardly with enough force between teeth 14, 16. From the narrow entrance to the cove, the space between the teeth edges 14, 16 flares outwardly toward an outer edge of the wire guide. The diameter of the root cove is slightly smaller than the outside diameter of the wire or cable 20. Therefore, the wire or cable jacket is squeezed and gripped by the walls of the root cove in order to provide strain relief.

If the wire is pulled upwardly with enough force, it may be pulled out of the grip of and removed from the root cove.

As used herein, the term "cable" is intended to be broad enough to cover any suitable number of wires which are normally treated as a single wire, such as: a twisted pair, plurality of wires in a single jacket, wires laced or otherwise tied together, color coded groups of wires, or the like.

Each of the teeth or tabs 12 has a suitable number of other wire identifying indicia formed on it, here by embossed numbers, letters, or the like, as shown at 22. Therefore, any wire passing between the particular teeth 14, 16 of FIG. 2 and being captured in the root cove 18 is identified as wire "8", in this particular example. It seems apparent that the strips themselves may also be identified, as by any suitable alpha-numerical symbology embossed thereon, by color coding, or the like. Thus, wire or cable 20 could be identified in a number of ways, such as "A9", "19", "red 9", or the like, if the strip 24 (FIG. 2) is further identified as "A", "1" or is colored red, for example.

Oppposite ends of each strip 12 terminate in preferably upstanding connectors 26, 28 (FIGS. 1, 3). Thus, for example, one strip 10 has connector 26 (FIG. 4) which is formed with a hook 30 which latches over a keeper bar 32 on another strip 10. Therefore, an opening 34 on one strip 10 may be pressed over the hook 30 on the next strip 10. There is enough flexibility in the neck of hook 30 so that it may flex and then snap over the keeper bar 32. This way, any suitable number of strips 10 may be snapped together or taken apart to form any suitable wire groupings.

In addition, opposite ends of each strip 10 have mounting holes 38, 40 which may receive any suitable fasteners such as bolts, screws, rivets, or the like. This type of fastener may be used to permanently mount the strip almost anywhere.

A push mount or anchor base is one form of fastener which is popular in the electronic industry. As shown in FIG. 5, this push mount form of anchor base comprises a central spar 44 having a pair of barbs 46, 48 which project therefrom in a generally arrowhead pattern. This form of anchor base may be provided on the bottoms of the strips 10A, 10B. The opposite side of the strip has a cavity 50 formed therein, to receive and capture the anchor base as it is pushed through a mounting hole 52 leading to the cavity. On passage through hole 52, the barbs are deflected inwardly and on emerging from the other side of the hole, the plastic memory causes the barbs to deflect outwardly into the capture position. The anchor base on the lowermost strip 10A may be pushed through a mounting hole in the supporting chassis 54, which may be anything from a printed circuit card to a steel shelf. Then, the anchor base of the next strip 10B is pushed into the mounting cavity 50 of strip 10A. In this manner, any suitable number of strips may be assembled into a large group.

Those who are skilled in the art will readily perceive how to modify the invention. Therefore, the appended claims are to be construed to cover all equivalent structures which fall within the true scope and spirit of the invention.

The invention claimed is:

1. A wire guide for receiving and supporting a plurality of wires or cables, said wire guide comprising an integral comb-like plastic strip having a plurality of teeth formed longitudinally in a row along the length thereof, a root cove formed at the bottom end of the space between each adjacent pair of teeth, each cove having a cross sectional dimension corresponding to the cross section of a wire or cable, each cove receiving, embracing, capturing, and securely holding a wire or cable, the adjacent sides of each pair of teeth being shaped and dimensioned to flare outwardly from a relatively narrow entrance to the cove toward the outer edge of the wire guide, said flared edges of the adjacent teeth guiding and directing said wire or cable as it passes from the outside edge of the wire guide into said root cove responsive to pressure exerted upon said wire or cable in the direction of said root cove, and each tooth having a window formed therein to give an added flexibility to said adjacent sides for enabling said edge to give while said cable enters said cove.

2. The wire guide of claim 1 wherein said strip includes at least one snap-on connector means oriented so that each of a plurality of said strips may be stacked and mechanically interconnected.

3. The wire guide of claim 2 wherein there is one of said connector means on each end of said strip.

4. The wire guide of claim 1 and indicia formed on said wire guide adjacent each root cove for identifying the wire or cable captured therein.

5. The wire guide of claim 4 wherein said indicia is formed on each of said teeth adjacent the space between said teeth.

6. A wire guide for organizing and holding a plurality of wires or cables of predetermined diameter, said guide comprising an integral comb-like plastic strip having a plurality of teeth formed along the length thereof, each of said teeth having a window formed therein, the top ends of spaces between adjacent teeth being relatively wide, the bottom ends of the spaces between adjacent teeth being formed into a relatively narrow entrance to an opening having a cross section which is shaped and dimensioned to correspond to the cross section of a wire or cable of a predetermined diameter to receive, grip, capture, and securely hold said wire or cable; said spaces between said teeth flaring from said bottom to said top ends, said predetermined diameter of said wires or cables being larger than the inside diameter of said opening, and the adjacent sides of each pair of teeth being shaped and dimensioned by said flaring to guide and direct a wire or cable into said opening responsive to a force applied upon the wire and acting in the direction of said opening, the adjacent sides having a flexibility resulting from the amount of material between said side and said window which enables said side to give and allow said wire to enter said opening and then to return to grip said wire, whereby said wire guide provides both wire arrangement and a strain relief.

7. The wire guide of claim 6 and snap connector means on said strip for anchoring said wire guide on a supporting structure.

8. The wire guide of claim 7 wherein there are a plurality of said wire guides and snap-on connector means on each end of the strips, forming each of said wire guides for interconnecting said plurality of guides.

* * * * *